INVENTOR.
PHILIP A. PHILLIPS
BY James R. Hulen
ATTORNEY.

INVENTOR.
PHILIP A. PHILLIPS
BY James R. Hulen
ATTORNEY.

May 31, 1966     P. A. PHILLIPS     3,253,489
EDGE CONTROL FOR SPLICING

Filed April 17, 1964     6 Sheets-Sheet 3

*Fig. 3*

INVENTOR.
PHILIP A. PHILLIPS
BY *James R. Hulen*
ATTORNEY.

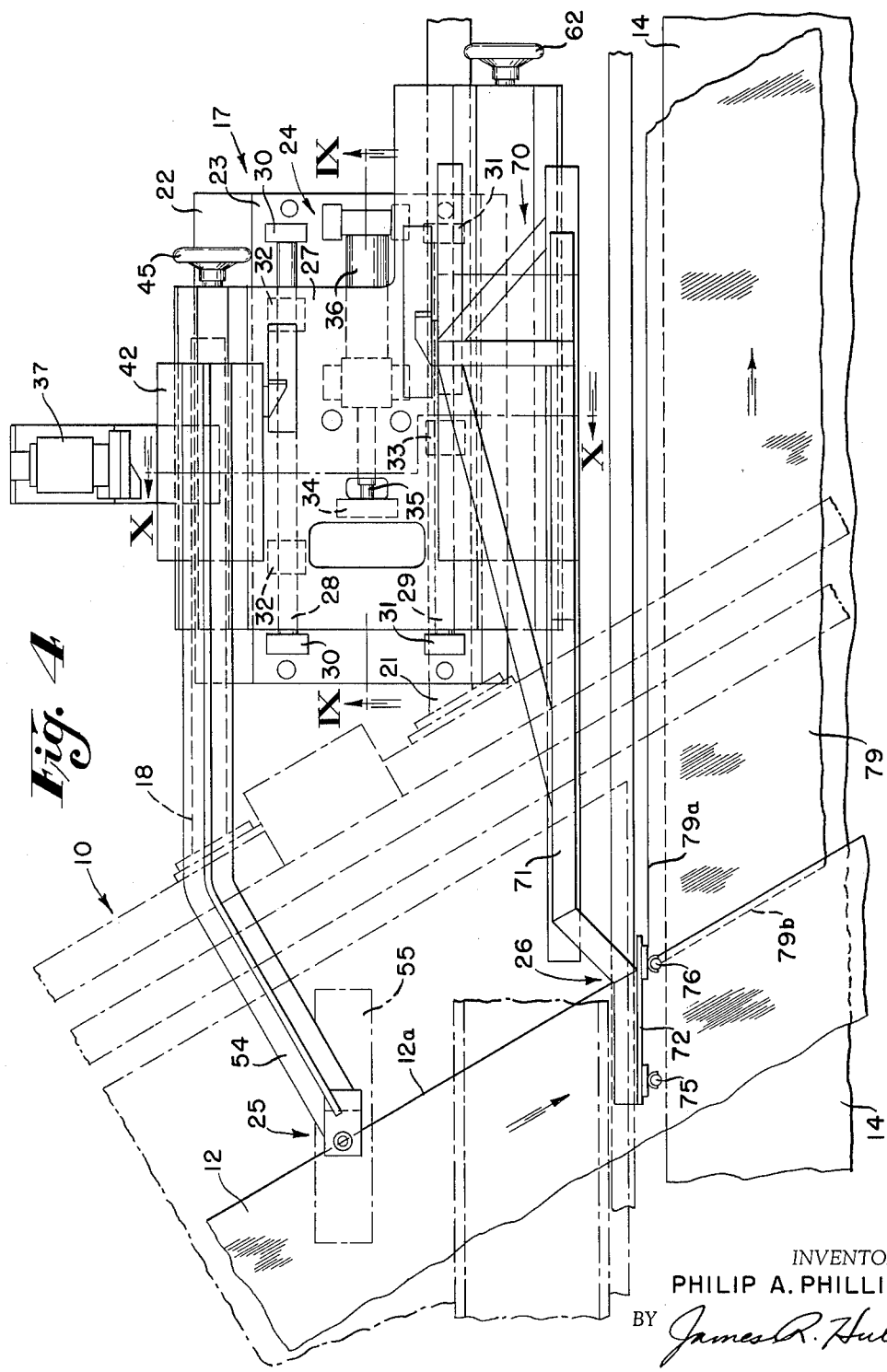

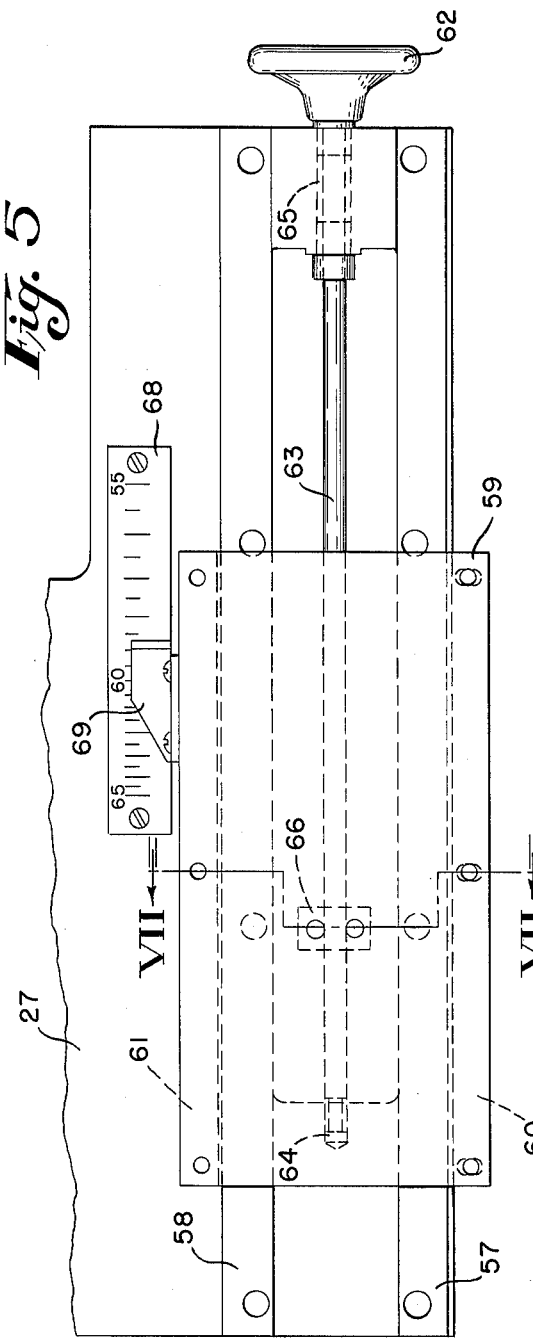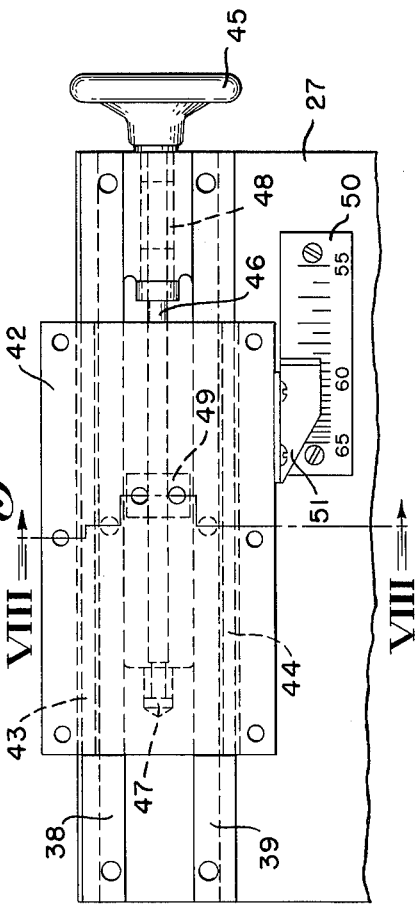

May 31, 1966 P. A. PHILLIPS 3,253,489
EDGE CONTROL FOR SPLICING
Filed April 17, 1964 6 Sheets-Sheet 6

INVENTOR.
PHILIP A. PHILLIPS
BY James R. Hulen
ATTORNEY.

United States Patent Office 3,253,489
Patented May 31, 1966

3,253,489
EDGE CONTROL FOR SPLICING
Philip A. Phillips, Detroit, Mich., assignor to United States Rubber Company, New York, N.Y., a corporation of New Jersey
Filed Apr. 17, 1964, Ser. No. 360,509
8 Claims. (Cl. 83—88)

This invention relates to a machine for processing tire fabric and, more particularly, to a machine for automatically and accurately controlling the amount of overlap between adjacent sections of cut fabric prior to splicing.

Bias-cut, rubber-coated, fabrics are conventionally used in the manufacture of rubber tires to add strength to the completed tire. Prior to being bias-cut, the fabric is manufactured as a continuous web or strip of rubber-coated material having parallelly arranged structural cords running in the longitudinal direction, and having weft threads interspersed thereacross at spaced intervals to retain the structural cords in alignment during the calendering or rubber coating operation. After fabrication of a calendered web of tire fabric having longitudinally arranged structural cords, the fabric is usually cut into rhombic shaped sections by a bias-cutting operation and the cut sections are manually spliced or joined together in overlapped end-wise relationship to form a second continuous web of bias-cut calendered fabric that is suitable for use in the building of a tire carcass.

It has been found that during the unrolling of the calendered web prior to cutting, the lateral edges of the fabric do not travel in a true lineal path. The lateral edges of the web subsequently form the leading and trailing edges of the cut sections. It is conceivable that the lateral edges of the fabric may vary from the lineal path as much as several inches, depending on the manufacturing care and tolerance observed during prior processing. This lineal variance, or transverse runout, of the lateral edges is predominant in a single section of bias-cut fabric by as much as plus or minus one-eighth inch and is cumulative in the length of a roll. Furthermore, it has been found that successive sections of bias-cut fabric have had a variance in overlap of as much as one-eighth of an inch.

Prior devices have been developed for providing accurate alignment of successive cut sections of fabric for subsequent splicing. However, these devices involve expensive equipment and loss of time due to additional manipulative steps. One such splicing method compensates for lateral edge runout by moving the first cut section of fabric away from the bias-cutter onto a lifting mechanism. The second bias-cut section is then moved into overlapping engagement with the trailing edge of the first cut section and spliced to it by lowering the lifting mechanism and pressing the overlapped edges together. It will be apparent that the equipment necessary to accomplish this method is cumbersome and requires excessive time to perform the alignment operation.

Accordingly, it is an object of this invention to provide an improved fabric processing apparatus.

A further object of this invention is to provide an extremely simple device for accurately controlling the amount of overlap between adjacent bias-cut sections of fabric.

A still further object is to provide a device for simultaneously sensing the lateral edge of a web of fabric to be cut into a section and halting the previously cut section on a conveyor so that a predetermined amount of overlap will be provided for adjacent sections.

The above and other objects are accomplished in accordance with this invention which comprises a conveyor halting means cooperative with the trailing edge of a first section of cut fabric for halting the conveyor on which the section is moved with the trailing edge at a predetermined location and a fabric edge detector means operatively connected to the halting means for sensing variations in a lateral edge of the fabric prior to cutting a second section and for positioning the halting means relative to the conveyor, so that, a predetermined amount of overlap is provided between the trailing edge and leading edge of adjacent sections.

For a better understanding of the present invention, together with other and further objects thereof, reference is made to the following description, taken in connection with the accompanying drawings, and its scope will be pointed out in the appended claims.

Referring now to the drawings:

FIG. 3 is a sectional view taken along line III—III of FIG. 2. Parts have been broken away for clarity.

FIG. 4 is a detailed top plan view of the invention taken along line IV—IV of FIG. 3.

FIG. 5 is an enlarged view taken along line V—V of FIG. 2.

FIG. 6 is an enlarged view taken along line VI—VI of FIG. 2.

The present invention may be used in combination with many standard tire fabric processing machines such as the machine described in United States Patent 3,192,094, to Phillips et al., issued on June 29, 1965 and also the machine described in United States Patent 3,142,603, to Parshall et al., issued on July 28, 1964.

Figure 1:
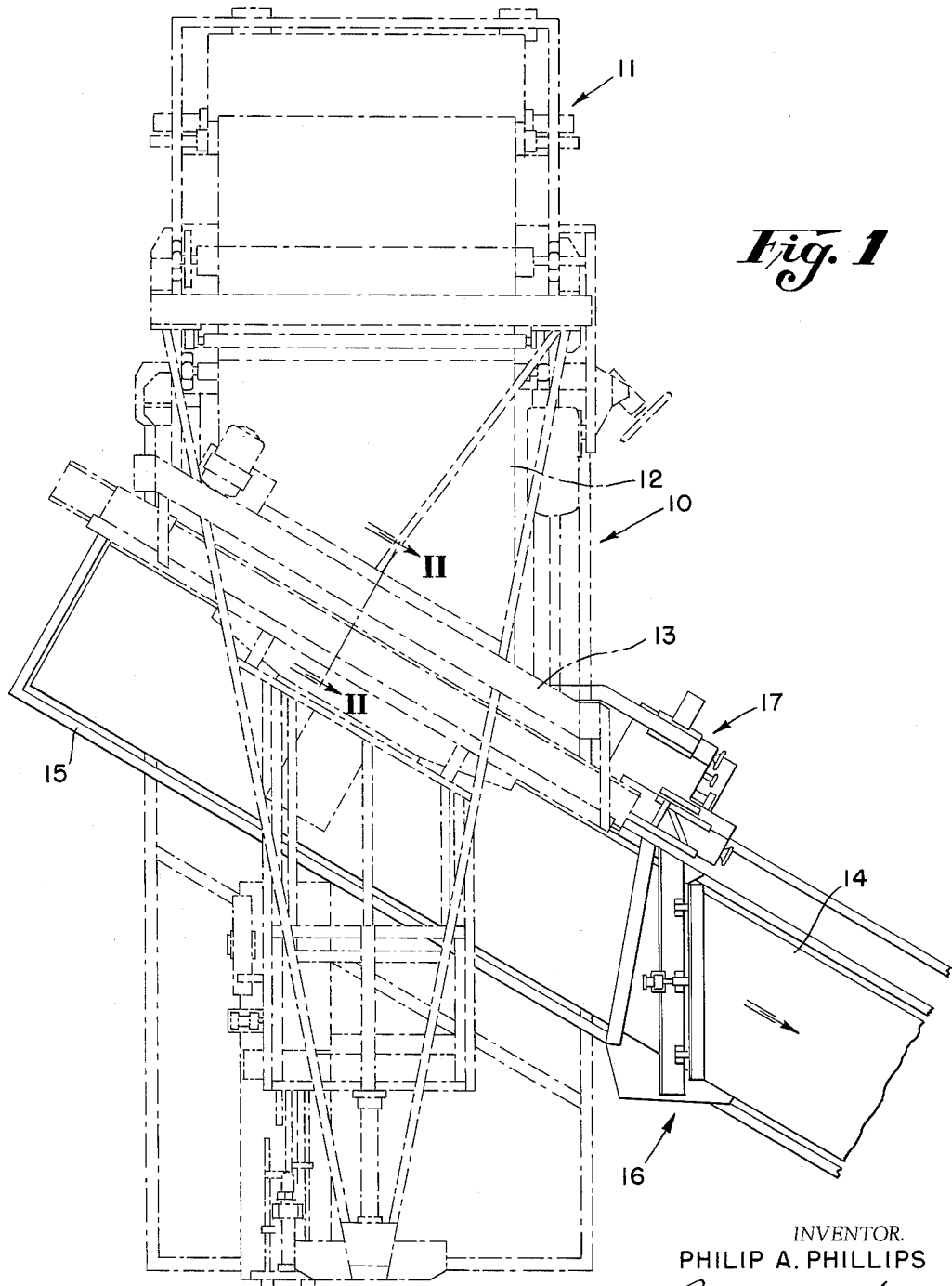
FIG. 1 is a diagrammatic top plan view of the device of the present invention shown in the environment of a fabric bias-cutter and conveyor.
Figure 2:
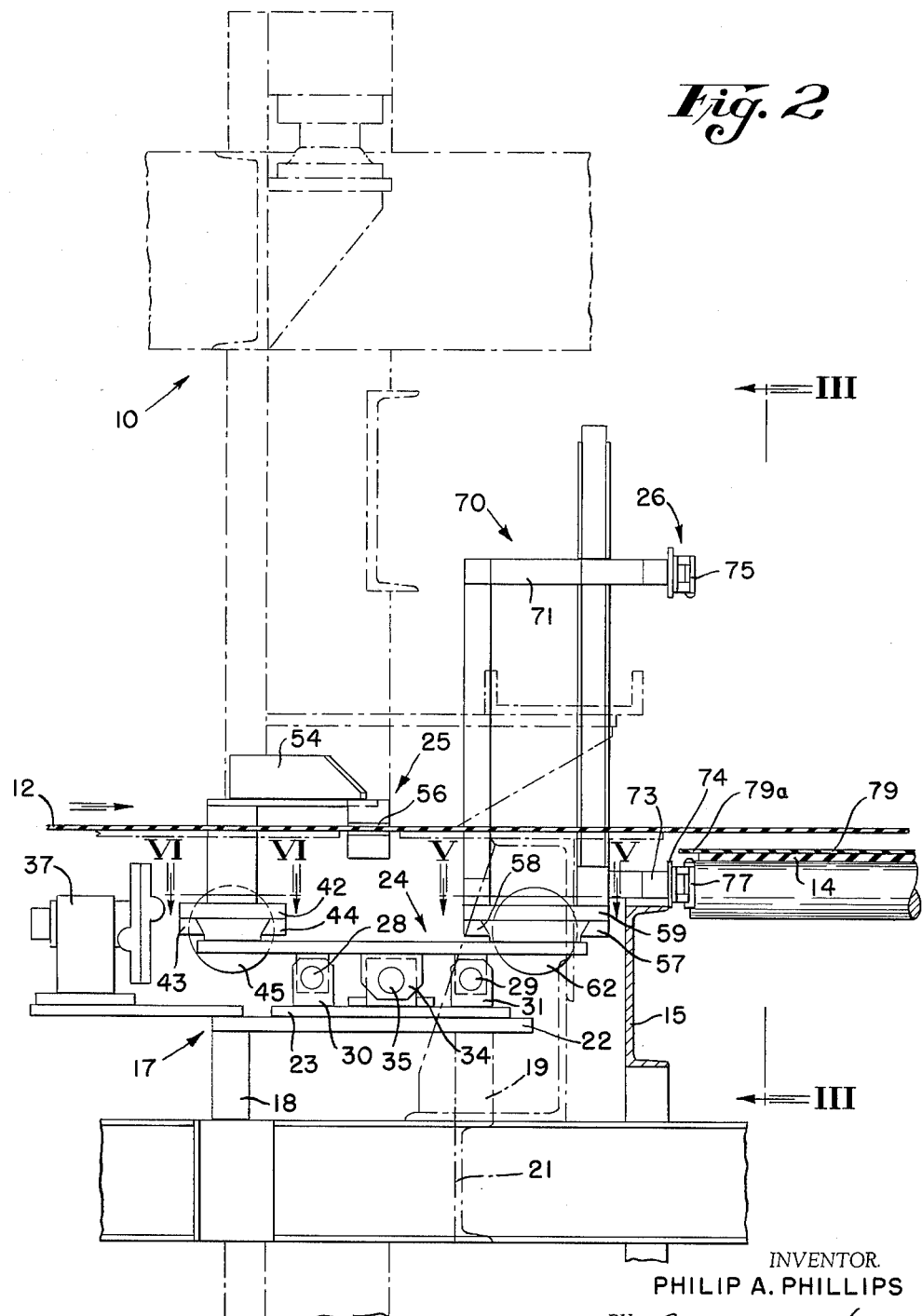
FIG. 2 is an enlarged sectional view taken along line II—II of FIG. 1.
Figure 7:
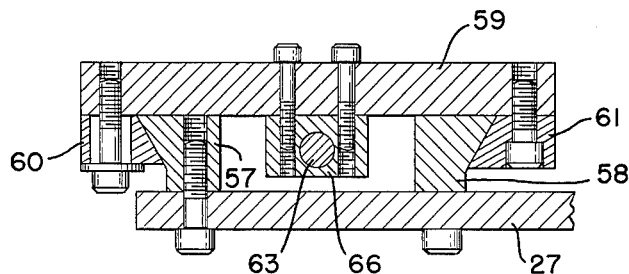
FIG. 7 is an enlarged sectional view taken along line VII—VII of FIG. 5.

Referring to FIG. 1 of the drawings, the invention is illustrated in combination with a portion of the machine of the aforementioned Patent No. 3,142,603. A bias-cutter unit shown generally at 10 has a fabric let-out unit 11 from which a web of fabric 12 may be fed to bias-cutter 13. Fabric 12 may be pulled or fed past the cutter 13 by any conventional means onto conveyor belt 14. Belt 14 is positioned below the fabric table of cutter 13 (see FIG. 2) so that the web will not contact the previously cut section as it is fed over the conveyor. A frame 15 supports belt 14 for movement in the direction of the arrow in FIG. 1 and also supports a conventional splicing device shown generally at 16 in FIG. 1.

The control mechanism of the present invention is shown generally at 17 in FIG. 1 mounted on the stationary framework of bias-cutter 10.

In the general operation of the apparatus of FIG. 1, fabric 12 is fed or pulled over conveyor belt 14 and a section is cut from the fabric by cutter 13. After a section is cut from fabric 12, the section drops onto belt 14 and is moved downstream until belt 14 is halted by a means to be described hereinbelow. A second section of fabric is then fed or pulled past cutter 13, then cut and dropped onto belt 14, so that, the leading edge of the second section overlaps the trailing edge of the first section. The two sections then move downstream where they are spliced at the overlapped portion by splicer 16.

The function of control mechanism 17 is to control the halting of belt 14 so that the trailing edge of each preceding section will have a uniform overlap with the leading edge of the succeeding section.

Referring to FIGS. 2 through 10, the specific structure of control mechanism 17 will now be described in detail. The entire mechanism is supported at one side by an angled beam 18 (see FIG. 3) which is secured to the stationary framework of bias-cutter 10 and at the other side by blocks 19 and 20 which are, in turn, supported by cantilever beam 21 which is secured at one end to the stationary framework of bias-cutter 10.

A plate 22 is secured atop beam 18 and blocks 19 and 20 and has support plate 23 secured to the upper surface thereof. Plate 23 forms the lower support for an adjustable support unit shown generally at 24, which unit provides a movable support for edge detector unit 25 and photo-cell unit 26 (see FIG. 4). Simultaneous movement of units 25 and 26 is accomplished by mounting the units on upper plate 27 of unit 24 (see FIG. 2).

Figure 9:
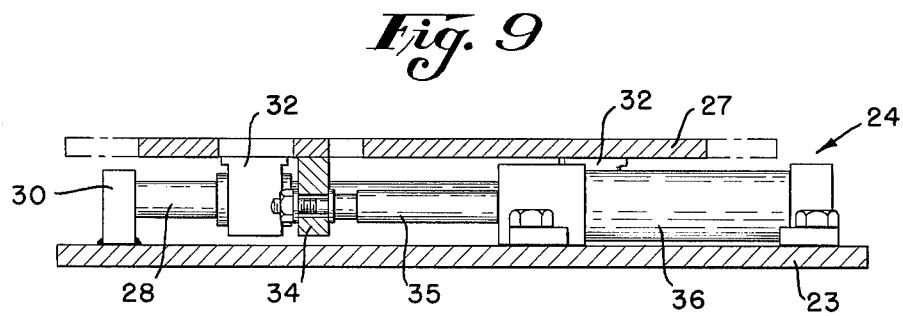
FIG. 9 is an enlarged sectional view taken along line IX—IX of FIG. 4.
Figure 10:
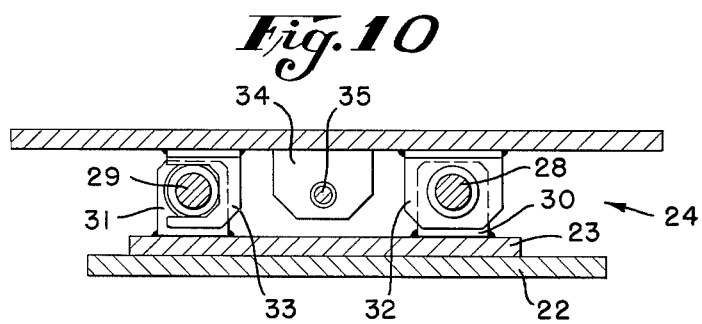
FIG. 10 is an enlarged sectional view taken along line X—X of FIG. 4.
Figure 8:
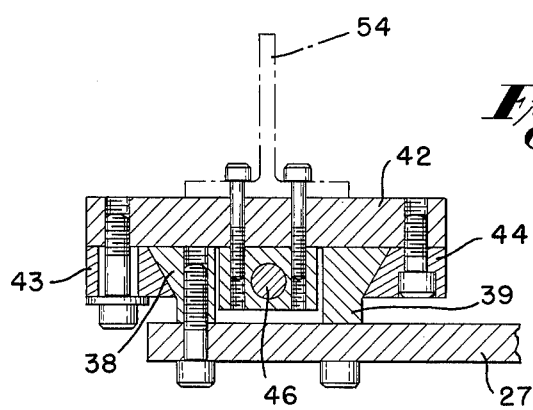
FIG. 8 is an enlarged sectional view taken along line VIII—VIII of FIG. 6.

Referring to FIGS. 9 and 10, a pair of guide rods 28 and 29 are supported atop plate 23 at their ends by spaced blocks 30 and 31, respectively. Plate 27 is slidably mounted at one side on rod 28 by a pair of bearing blocks 32 and at its other side by a single bearing block 33. A center block 34 is attached to the underside of plate 27 and the movement of plate 27 relative to rods 28 and 29 is accomplished by the extension and retraction of a piston rod 35 (see FIG. 9). Piston rod 35 is attached at one end to block 34 and at its other end to a piston (not shown) which is slidably mounted within double acting cylinder 36. A regulator 37 (see FIG. 4) controls the flow of pressurized fluid to both sides of cylinder 36 from a source not shown and enables plate 27 to be moved from the full line position shown in FIG. 9 to either of the broken line positions.

Referring to FIGS. 2, 3, 4, 6 and 8, the mechanism for mounting and adjusting the edge detector unit 25 on plate 27 will now be described in detail.

A pair of angled bars 38 and 39 (see FIG. 8) are bolted or otherwise joined to the upper surface of plate 27. An upper support plate 42 is slidably supported for longitudinal movement atop bars 38 and 39. A pair of angled blocks 43 and 44 are secured to the underside of plate 42 and form a dovetail groove in which the rail formed by bars 38 and 39 may be disposed. To accomplish the adjustment of the position of plate 42 relative to plate 27, a handwheel 45 is provided. Handwheel 45 is secured to one end of a threaded shaft 46 which is supported atop plate 27 in bearings 47 and 48 (see FIG. 6). A threaded center block 49 is bolted to the underside of plate 42 and has a threaded connection with shaft 46. Thus, the turning of handwheel 45 will result in the movement of plate 42 relative to plate 27.

To provide means for accurately positioning plate 42 relative to plate 27, a scale 50 is secured to the upper surface of plate 27 and a pointer 51 is secured to plate 42 for indicating the numerical reading on scale 50.

A structural bracket 54 is secured to the upper surface of plate 42 (see FIGS. 3 and 4) and extends outwardly over bias-cutter 10. Edge detector unit 25 is secured to the outermost end of bracket 54 and extends downwardly into an opening 55 in the top of the fabric table for cutter 10. Unit 25 is provided with a horizontally arranged slot 56 (see FIGS. 2 and 3) through which the lateral edge 12a of fabric 12 may pass as the fabric is fed or pulled past the bias-cutter.

Edge detector unit 25 is a standard commerical device that is sold by The North American Manufacturing Company, Hydraulic Controls Division located at 445 East 71st Street, Cleveland 5, Ohio. The device is operated by means of low pressure air directed across the slot 56. The regulator 37 (see FIG. 4) is responsive to the amount of air which is permitted to pass from one side of the unit to the other. Regulator 37 is controlled by this air pressure and, in turn, controls the flow of pressurized fluid to cylinder 36. The pressure required to operate cylinder 36 in either direction should be plus or minus ½ the air directed across the slot 56. If edge 12a of fabric 12 is directly over the center of the air path, unit 25 will remain stationary and, likewise, plates 42 and 27 to which the unit is secured will remain stationary. On the other hand, if a variation in the location of edge 12a occurs, unit 25 will sense the variation and regulator 37 will actuate cylinder 36 to compensate for the variation to again bring the air path directly over edge 12a.

The mechanism for mounting photo-cell unit 26 on the upper surface of plate 27 is substantially identical to that used for mounting unit 25. A rail is formed on the upper surface of plate 27 by angled bars 57 and 58 (see FIG. 7) and a support plate 59 is slidably mounted on the bars. A dovetail groove is provided on the underside of plate 59 by blocks 60 and 61 secured thereto.

Relative movement between plates 59 and 27 is accomplished by manually operable hand wheel 62 (see FIG. 5). Wheel 62 is secured to one end of threaded shaft 63 which is rotatably supported on plate 27 by bearings 64 and 65. A threaded center block 66 is secured to plate 59 and has a threaded connection with shaft 63. A scale 68 is secured to the upper surface of plate 27 and a pointer 69 is secured to plate 59 to indicate the numerical value on scale 68 as plate 59 is moved relative to plate 27.

A structural bracket shown generally at 70 (see FIG. 3) is secured to plate 59 and has a horizontally extending arm 71 to which a photo-cell support 72 is secured. A beam 73 is also secured to plate 59 and carries a light source support 74 at the end thereof. Photo-electric relays are established by mounting photo-cells 75 and 76 on support 72 in vertical alignment above light sources 77 and 78, respectively, on support 74.

A drive motor (not shown), such as that described to the aforementioned copending patent application Serial No. 23,500, having a high speed winding an a low speed winding, is utilized to power the endless conveyor 14 by means of a belt and pulley system (not shown). The two speed conveyor drive motor is utilized in order to provide for high speed removal of cut sections of fabric from the area of the bias-cutter 10 so that rapid recycling may occur, and, yet, allow low or "crawling" speed for positioning the cut sections of fabric to insure accuracy in overlapping when a subsequently cut section of fabric is fed into position. Control over the speed of conveyor 14 is achieved by the photo-electric relays previously described.

Referring to FIG. 4, the illustrated embodiment of the invention shows a section of fabric 79 with a lateral edge 79a overhanging the edge of conveyor 14. With edge 79a thus overhanging the lateral edge of conveyor 14, the movement of cut section 79 along conveyor 14 will cause the light sources 77 and 78 to be blocked out. The circuit connections of the photo-electric relays are such that, upon initially starting the machine, the first cut section (section 79 in FIG. 4) will be carried by conveyor 14 to, and past, both photo-electric relays at high speed. When light source 77 becomes uncovered by the trailing edge 79b of section 79, the drive motor will be slowed down to a "crawling" speed, and, upon subsequent uncovering of light source 78, conveyor 14 will be stopped.

In the operation of the apparatus, the acute bias angle at which fabric 12 is to be cut is selected and this angle is set into scales 50 and 68 by appropriate turning of handwheels 45 and 62, respectively. With pointers 51 and 69 at the appropriate scale readings, detector unit 25 and photo-cell 76 on unit 26 will be in approximate alignment with the lateral edge 12a of fabric 12. An appropriate adjustment must either be pre-set into scales 50 and 68 to allow for the desired amount of overlap between adjacent sections of cut fabric or photo-cell 76 may be adjusted on bracket 71 to accomplish the desired overlap.

At the beginning of the operation, it will be apparent that edge detector unit 25 may be required to "find" the lateral edge 12a of fabric 12. This is done by first feeding or pulling a portion of fabric 12 past bias-cutter 10. If edge detector unit 25 is not in contact with the edge of the fabric, regulator 37 will supply pressurized fluid to the right side of cylinder 36 as viewed in FIG. 4 to force plate 27 and units 25 and 26 to the left until an equilibrium position has been reached with fabric edge 12a midway in the air path of detector 25. This condition will then be maintained throughout the operation. If, on the other hand, the air path of detector 25 is completely blocked by fabric 12, regulator 37 will supply pressurized fluid to the left side of cylinder 36 as viewed in FIG. 4 to thus force plate 27 and units 25 and 26 to the right. This movement will continue until equilibrium is reached.

With units 25 and 26 in position, fabric 12 is fed past the bias-cutter 10 and onto conveyor 14. The first section of fabric 79 is then cut and dropped onto conveyor 14 with lateral edge 79a covering light sources 77 and 78.

During the preceding operation, regulator 37 will maintain unit 25 precisely in alignment with lateral edge 12a of fabric 12. Conveyor 14 may now be actuated to move section 79 downstream. When photo-cell 77 becomes uncovered by trailing edge 79b of section 79, conveyor 14 will be slowed down to a "crawling" speed and upon subsequent uncovering of photo-cell 78, the conveyor will halt. Thus, the trailing edge 79a will be halted at a predetermined location in a position to have a predetermined amount of overlap with the leading edge of the succeeding section of cut fabric.

The electrical circuitry of the system is such that a time delay or other conventional means will prevent the movement of conveyor 14 until the succeeding section of fabric has been cut from fabric 12 and dropped into overlapping relationship with the previous section. When this has been done, the conveyor 14 will again move the fabric downstream to initiate another cycle of operation.

It will thus be apparent that this invention provides a means for rapidly and accurately aligning adjacent sections of bias-cut fabric so that a predetermined and uniform amount of overlap is realized.

This invention also provides a greatly improved means for compensating for the lateral edge run-out experienced with the use of rolled fabric.

While there has been described what is at present considered to be the preferred embodiment of this invention, it will be obvious to those skilled in the art that various changes and modifications may be made therein without departing from the invention, and it is therefore aimed to cover all such changes and modifications as fall within the true spirit and scope of this invention.

Having thus described my invention, what I claim and desire to protect by Letters Patent is:

1. In an apparatus wherein a web of tire building fabric is fed past a cutting mechanism and cut into sections, said sections being subsequently moved away on a conveyor in a direction substantially parallel to the cutting angle of said cutting mechanism, the leading and trailing edges of said sections being formed by the lateral edges of said web prior to the cutting of the sections, the improvement comprising: a first means responsive to the position of a lateral edge of said web; a second means cooperative with the trailing edge of a first section of fabric on said conveyor for halting said conveyor with said trailing edge at a predetermined location; and means operatively interconnecting said first and second means so that said second means is located relative to said conveyor in accordance with the position of said lateral edge; whereby, upon cutting a second section of fabric from said web, the leading edge of said second section overlaps the trailing edge of said first section by a predetermined amount.

2. In an apparatus wherein a web of tire building fabric is fed past a cutting mechanism and cut into sections, said sections being subsequently moved away on a conveyor in a direction substantially parallel to the cutting angle of said cutting mechanism, the leading and trailing edges of said sections being formed by the lateral edges of said web prior to the cutting of the sections, the improvement comprising: conveyor halting means cooperative with the trailing edge of a first section of fabric for halting said conveyor when said trailing edge arrives at a predetermined location; and fabric edge detector means operatively connected to said halting means for detecting a lateral edge of said fabric prior to cutting a second section of fabric and for controlling the location of said halting means relative to said lateral edge; whereby, upon cutting a second section of fabric from said web, the leading edge of said second section overlaps the trailing edge of said first section by a predetermined amount.

3. The apparatus of claim 2 wherein said first means comprises a photo-electric relay means for sensing said trailing edge.

4. The apparatus of claim 3 wherein said photoelectric relay means comprises a first photo-cell for decreasing the speed of said conveyor and a second photo-cell for halting said conveyor.

5. In an apparatus wherein a web of tire building fabric is fed past a cutting mechanism and cut into sections, said sections being subsequently moved away on a conveyor in a direction substantially parallel to the cutting angle of said cutting mechanism, the leading and trailing edges of said sections being formed by the lateral edges of said web prior to the cutting of the sections, the improvement comprising: conveyor halting means cooperative with the trailing edge of a first section of fabric on said conveyor for halting said conveyor when said trailing edge arrives at a predetermined location; a fabric edge detector means for sensing and maintaining alignment with a lateral edge of said web prior to cutting; and means operatively interconnecting said halting means and said detector means for simultaneous movement so that the location of said halting means relative to said conveyor is determined by the position of said lateral edge; whereby, upon cutting a second section of fabric from said web, the leading edge of said second section overlaps the trailing edge of said first section by a predetermined amount.

6. The apparatus of claim 5 wherein said interconnecting means comprises: a plate to which said halting means and said detector means are adjustably mounted; a cylinder for moving said plate; and a regulator for controlling the flow of pressurized fluid to said cylinder to control the position of said plate.

7. The apparatus of claim 6 wherein said detector means comprises: a unit having a horizontally arranged slot extending therethrough for receiving said lateral edge; means for directing pressurized air across said slot in contact with said edge; means responsive to the amount of air passing said edge for controlling said regulator; and means for adjusting the position of said unit relative to said plate.

8. The apparatus of claim 7 wherein said adjusting means comprises a scale which indicates the angle at which said web is to be cut.

References Cited by the Examiner

UNITED STATES PATENTS 1,581,583   4/1926   Low _____ 271—87
2,639,772   5/1953   Sandberg et al. _____ 83—88 X WILLIAM W. DYER, Jr., *Primary Examiner.*

L. B. TAYLOR, *Assistant Examiner.*